US011482992B2

United States Patent
Srivastava et al.

(10) Patent No.: US 11,482,992 B2
(45) Date of Patent: Oct. 25, 2022

(54) CLOCK SWEEPING SYSTEM

(71) Applicant: NXP USA, Inc., Austin, TX (US)

(72) Inventors: Neha Srivastava, New Delhi (IN); Ateet Mishra, Noida (IN); Ankur Behl, New Delhi (IN); Nancy Mishra, Noida (IN); Kriti Garg, Kurukshetra (IN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/247,949

(22) Filed: Dec. 31, 2020

(65) Prior Publication Data
US 2022/0209759 A1 Jun. 30, 2022

(51) Int. Cl.
*H03K 5/135* (2006.01)
*G06F 30/3308* (2020.01)
*G06F 111/04* (2020.01)
*G06F 115/02* (2020.01)
*H03K 5/00* (2006.01)

(52) U.S. Cl.
CPC ......... *H03K 5/135* (2013.01); *G06F 30/3308* (2020.01); *G06F 2111/04* (2020.01); *G06F 2115/02* (2020.01); *H03K 2005/00019* (2013.01)

(58) Field of Classification Search
CPC .......... H03K 5/135; H03K 2005/00019; G06F 30/3308; G06F 2111/04; G06F 2115/02
USPC ........................................................ 327/276
See application file for complete search history.

(56) References Cited

U.S. PATENT DOCUMENTS

| 7,447,620 | B2 | 11/2008 | Hidvegi et al. |
| 7,484,196 | B2 * | 1/2009 | Ja .................. G06F 30/3312 716/108 |
| 8,085,817 | B1 * | 12/2011 | Fouts .................. H03L 7/0814 370/537 |
| 2004/0225977 | A1 | 11/2004 | Akkerman |
| 2009/0138837 | A1 * | 5/2009 | Baumgartner ...... G06F 30/3323 716/113 |
| 2010/0115482 | A1 | 5/2010 | DiLullo et al. |
| 2011/0006821 | A1 | 1/2011 | Osborne |

OTHER PUBLICATIONS

IP.com, "Asynchronous Clock Domain Behaviour Introduction in RTL Clock Tree," IP.com Number: IPCOM000256869D, IP.com Electronic Publication Date: Jan. 6, 2019, 14 pages.

* cited by examiner

*Primary Examiner* — Tomi Skibinski

(57) ABSTRACT

A clock sweeping system includes multiple delay elements and a selection circuit. The delay elements are configured to generate multiple delayed clock signals. Each delay element is configured to receive an input signal and delay the input signal to generate a corresponding first delayed clock signal. The input signal is one of a first clock signal, a second clock signal, and a corresponding output signal generated by a previous delay element. The selection circuit is configured to select and output, based on a first select signal for a plurality of times, a corresponding second delayed clock signal as a first output clock signal. The selection circuit is further configured to select and output, based on a second select signal, one of the first and second clock signals as a second output clock signal. The first output clock signal is asynchronous with respect to the second output clock signal.

20 Claims, 5 Drawing Sheets

CLOCK SWEEPING SYSTEM

BACKGROUND

The present disclosure relates generally to electronic circuits, and, more particularly, to a clock sweeping system.

A system-on-chip (SoC) includes multiple clock trees that provide various pairs of clock signals that are utilized by various circuits on the SoC. During a register-transfer level (RTL) simulation and a gate level simulation (GLS) of a design of the SoC, the clock signals in each pair exhibit same phase relation with respect to each other. As a result, the SoC fails to generate metastability or glitch based on the pair of clock signals that may be generated otherwise when the pair of clock signals exhibits an asynchronous behavior.

A conventional clock sweeping system is utilized in the SoC to sweep clock signals against each other, during the RTL simulation and the GLS, to verify and validate a design of the SoC. However, due to same phase relation between the clock signals in the same pair, a fault in data communication associated with the pair of clock signals on the SoC is not captured during the verification and validation of the design at the RTL simulation and the GLS. The fault is thus propagated when the SoC is manufactured. Further, on-chip variations (OCV), process, voltage, and temperature (PVT) variations, and printed circuit board noises introduced in the SoC lead to unintended aligning of the phases of the clock signals. Thus, the conventional clock sweeping system fails to capture potential faults in the data communication associated with the pair of clock signals on the SoC during silicon validation and testing of the SoC. Therefore, there exists a need for a technical solution that solves the aforementioned problems of the conventional clock sweeping systems.

SUMMARY

In one embodiment, a clock sweeping system is disclosed. The clock sweeping system includes a plurality of delay elements that are coupled in series, and configured to generate a plurality of delayed clock signals. Each delay element is configured to receive an input signal and delay the input signal to generate a corresponding first delayed clock signal of the plurality of delayed clock signals. The input signal is one of a first clock signal, a second clock signal, and an output signal generated by a previous delay element of the plurality of delay elements. The clock sweeping system further includes a selection circuit that is coupled with the plurality of delay elements, and configured to receive the plurality of delayed clock signals, the first and second clock signals, and first and second select signals. The selection circuit is further configured to select and output, based on the first select signal for a plurality of times, a corresponding second delayed clock signal of the plurality of delayed clock signals as a first output clock signal. The selection circuit is further configured to select and output, based on the second select signal, one of the first and second clock signals as a second output clock signal. The first output clock signal is asynchronous with respect to the second output clock signal.

In another embodiment, a system-on-chip (SoC) is disclosed. The SoC includes first and second multiplexers, and a clock sweeping system. The first and second multiplexers are configured to receive first and second pluralities of clock signals and first and second select signals, respectively. The first multiplexer is further configured to select and output a first clock signal from the first plurality of clock signals based on the first select signal. The second multiplexer is further configured to select and output a second clock signal from the second plurality of clock signals based on the second select signal. The clock sweeping system is coupled with the first and second multiplexers. The clock sweeping system includes a plurality of delay elements that are coupled in series, and configured to generate a plurality of delayed clock signals. Each delay element is configured to receive an input signal and delay the input signal to generate a corresponding first delayed clock signal of the plurality of delayed clock signals. The input signal is one of a first clock signal, a second clock signal, and an output signal generated by a previous delay element of the plurality of delay elements. The clock sweeping system further includes a selection circuit that is coupled with the plurality of delay elements, and configured to receive the plurality of delayed clock signals, the first and second clock signals, and the first and second select signals. The selection circuit is further configured to select and output, based on the first select signal for a plurality of times, a corresponding second delayed clock signal of the plurality of delayed clock signals as a first output clock signal. The selection circuit is further configured to select and output, based on the second select signal, one of the first and second clock signals as a second output clock signal. The first output clock signal is asynchronous with respect to the second output clock signal.

In yet another embodiment, a clock sweeping method is disclosed. The clock sweeping method includes receiving an input signal by each delay element of a plurality of delay elements of a clock sweeping system. The input signal is one of a first clock signal, a second clock signal, and an output signal generated by a previous delay element of the plurality of delay elements. The clock sweeping method further includes delaying, by each delay element of the plurality of delay elements, the input signal to generate a corresponding first delayed clock signal of a plurality of delayed clock signals. The clock sweeping method further includes receiving, by a selection circuit of the clock sweeping system, the plurality of delayed clock signals, the first and second clock signals, and first and second select signals. The clock sweeping method further includes selecting, by the selection circuit for a plurality of times, a corresponding second delayed clock signal of the plurality of delayed clock signals based on the first select signal. The clock sweeping method further includes outputting, by the selection circuit for the plurality of times, the corresponding second delayed clock signal as a first output clock signal. The clock sweeping method further includes selecting, by the selection circuit, one of the first and second clock signals based on the second select signal. The clock sweeping method further includes outputting, by the selection circuit, one of the first and second clock signals as a second output clock signal. The first output clock signal is asynchronous with respect to the second output clock signal.

In some embodiments, the selection circuit includes first and second multiplexers. The first multiplexer is coupled with the plurality of delay elements, and configured to receive the first select signal and the plurality of delayed clock signals. The first multiplexer is further configured to select and output, based on the first select signal for the plurality of times, the corresponding second delayed clock signal as the first output clock signal. The second multiplexer is configured to receive the first and second clock signals and the second select signal. The second multiplexer is further configured to select and output, based on the second select signal, one of the first clock signal and the second clock signal as the second output clock signal.

In some embodiments, the clock sweeping system further includes a third multiplexer that is coupled with the plurality of delay elements, and configured to receive the second select signal and the first and second clock signals. The third multiplexer is further configured to select and provide, based on the second select signal, one of the first and second clock signals to the plurality of delay elements. The second multiplexer is configured to select the second clock signal when the third multiplexer selects the first clock signal. The second multiplexer is further configured to select the first clock signal when the third multiplexer selects the second clock signal.

In some embodiments, the clock sweeping system further includes a mode selector that is coupled with the first through third multiplexers, and configured to receive first through third control signals. The mode selector is further configured to generate the first and second select signals based on one of the first through third control signals. The mode selector is further configured to provide the first select signal to the first multiplexer and the second select signal to the second and third multiplexers.

In some embodiments, the first multiplexer selects, for the plurality of times, the corresponding second delayed signal from a first set of delayed clock signals of the plurality of delayed clock signals when the mode selector generates the first select signal based on the first control signal. The first multiplexer further selects, for the plurality of times, the corresponding second delayed signal from a second set of delayed clock signals of the plurality of delayed clock signals when the mode selector generates the first select signal based on the second control signal. The first multiplexer further selects, for the plurality of times, the corresponding second delayed signal from a third set of delayed clock signals of the plurality of delayed clock signals when the mode selector generates the first select signal based on the third control signal.

In some embodiments, the clock sweeping system further includes a first control circuit that is coupled with the mode selector. The first control circuit includes an edge detector and a delay controller. The edge detector is configured to receive the first and second clock signals and generate first and second edge signals. The first edge signal is indicative of one of positive and negative clock edges of the first clock signal, and the second edge signal is indicative of one of positive and negative clock edges of the second clock signal. The delay controller is coupled with the edge detector and the mode selector, and configured to receive the first and second edge signals. The delay controller is further configured to generate and provide the first and second control signals based on the first and second edge signals to the mode selector, respectively.

In some embodiments, the clock sweeping system further includes a second control circuit that is coupled with the mode selector, and configured to receive the first and second clock signals, and generate the third control signal.

Various embodiments of the present disclosure disclose a clock sweeping system. The clock sweeping system includes delay elements and a selection circuit. Each delay element is configured to receive an input signal and delay the input signal to generate a corresponding delayed clock signal. The input signal is one of a first clock signal, a second clock signal, and an output signal generated by a previous delay element. The selection circuit is configured to select and output, based on a corresponding select signal for multiple times, a corresponding delayed clock signal as an output clock signal. Further, the selection circuit is configured to select and output, based on another select signal, one of the first and second clock signals as another output clock signal. Based on the outputs of the selection circuit, the two output clock signals are asynchronous with respect to each other.

The selection circuit selects and outputs for multiple times, the corresponding delayed clock signal as one of the output clock signal and one of the first and second clock signals as another output clock signal such that the corresponding delayed clock signal is a delayed version of one of the first and second clock signals. Thus, the clock sweeping system sweeps the first and second clock signals with respect to each other and outputs all possible pairs of asynchronous clock signals (i.e., the two output clock signals). Further, as multiple clock sweeping systems may be utilized in the SoC or multiple clock signals may be provided to the clock sweeping system during silicon validation and testing, the clock sweeping system is able to capture a fault in data communication associated with the first and second clock signals on the SoC and is not affected due to on-chip variations (OCV), process, voltage, and temperature (PVT) variations, as well as printed circuit board noises associated with the SoC. The clock sweeping system of the present disclosure thus is configured to provide complete coverage of asynchronous clock signals on the SoC by sweeping clock signals of each asynchronous clock signal pair (such as the first and second clock signals) on the SoC as compared to conventional clock sweeping systems that fail to provide complete coverage of the asynchronous clock signals on the SoC.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
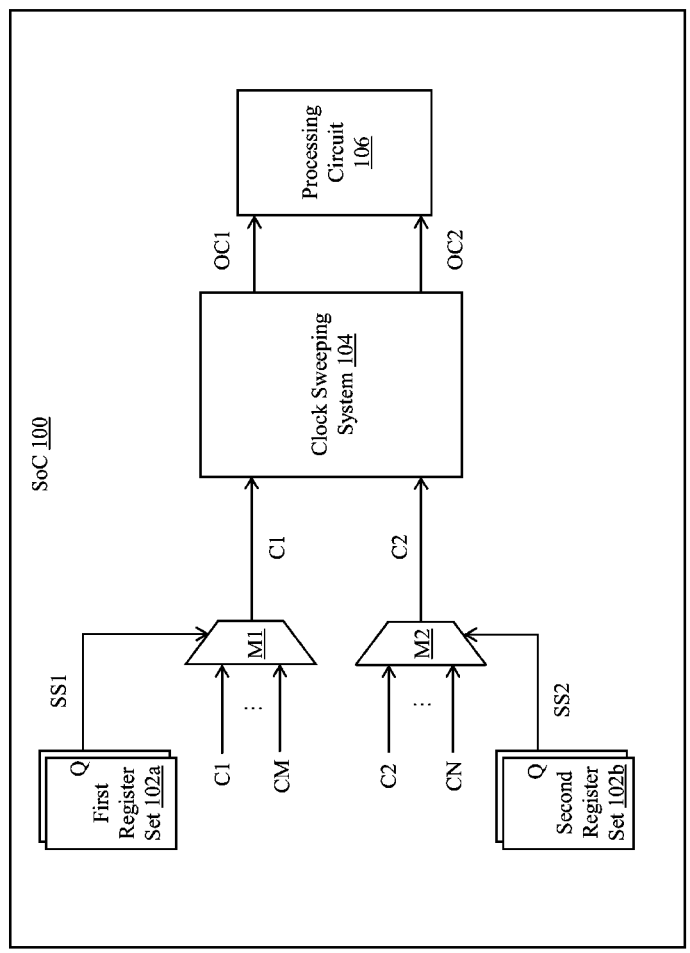
FIG. 1 illustrates a schematic block diagram of a system-on-chip (SoC) in accordance with an embodiment of the present disclosure.

FIG. 1 illustrates a schematic block diagram of a system-on-chip (SoC) 100 in accordance with an embodiment of the present disclosure. The SoC 100 may be utilized in various devices such as automotive devices, mobile devices, network devices, or the like. Before manufacturing of the SoC 100, a design of the SoC 100 may be generated by way of an electronic design automation (EDA) tool. The design of the SoC 100 may be described by utilizing a hardware-description language (HDL), very high speed integrated circuit (VHSIC) hardware description language (VHDL), and the like. During the generation of the design of the SoC 100, multiple clock signals (such as first and second pluralities of clock signals C1, ..., CM and C2, ..., CN) may be defined in the design of the SoC 100.

The first and second pluralities of clock signals C1, ..., CM and C2, ..., CN include first and second sets of asynchronous clock signal pairs. Each asynchronous clock signal pair of the first and second sets of asynchronous clock signal pairs includes two clock signals that are asynchronous to each other. In one example, a first asynchronous clock signal pair of the first set of asynchronous clock signal pairs includes a first clock signal C1 of the first plurality of clock signals C1, ..., CM and a second clock signal C2 of the second plurality of clock signals C2, ..., CN. Further, a second asynchronous clock signal pair of the second set of asynchronous clock signal pairs includes an Mth clock signal CM of the first plurality of clock signals C1, ..., CM and an Nth clock signal CN of the second plurality of clock signals C2, ..., CN. The first and second sets of asynchronous clock signal pairs are defined by first and second design constraint information (not shown) associated with the SoC 100. The first and second design constraint information indicate timing and frequency information of each clock signal in the first and second sets of asynchronous clock signal pairs.

During a register-transfer level (RTL) simulation associated with the SoC 100, two clock signals of each asynchronous clock signal pair of the first set of asynchronous clock signal pairs (such as the first and second clock signals C1 and C2) are swept with respect to each other for a plurality of times. During a gate-level simulation (GLS) associated with the SoC 100, the two clock signals of each asynchronous clock signal pair of the first set of asynchronous clock signal pairs are swept with respect to each other for a plurality of times. Further, during the GLS, two clock signals of each asynchronous clock signal pair of the second set of asynchronous clock signal pairs (such as the Mth and Nth clock signals CM and CN) are swept with respect to each other for a plurality of times. In one embodiment, the second set of asynchronous clock signal pairs are further added during the RTL simulation. Thus, the RTL simulation and the GLS are implemented to determine complete coverage of asynchronous clock signals on the SoC 100 by sweeping clock signals of each asynchronous clock signal pair on the SoC 100.

During the RTL simulation, each asynchronous clock signal pair of the first set of asynchronous clock signal pairs is validated by testing that the two clock signals of each asynchronous clock signal pair are asynchronous after sweeping the two clock signals with respect to each other. All the validated asynchronous clock signal pairs are preserved for the GLS. During the GLS, each asynchronous clock signal pair of the first and second sets of asynchronous clock signal pairs is validated by testing that the two clock signals of each asynchronous clock signal pair of the first and second sets of asynchronous clock signal pairs are asynchronous after sweeping the two clock signals with respect to each other. All the validated asynchronous clock signal pairs of the first and second sets of asynchronous clock signal pairs are added to the RTL simulation for increased coverage of all possible asynchronous clock signal pairs. As a result, all the validated asynchronous clock signal pairs of the first and second sets of asynchronous clock signal pairs are implemented, i.e., utilized for executing various operations, in the SoC 100 after the SoC 100 is manufactured based on the RTL simulation and the GLS. The SoC 100 includes first and second register sets 102a and 102b, first and second multiplexers M1 and M2, a clock sweeping system 104, and a processing circuit 106.

The first and second register sets 102a and 102b are configured to generate first and second select signals SS1 and SS2. The first select signal SS1 indicates a selection of a clock signal (example, the first clock signal C1) of the first plurality of clock signals C1, ..., CM. The second select signal SS2 indicates a selection of a clock signal (example, the second clock signal C2) of the second plurality of clock signals C2, ..., CN. In one embodiment, the first and second register sets 102a and 102b include one of a general-purpose register, a special-purpose register, a status register, and the like.

The first and second multiplexers M1 and M2 are coupled with the first and second register sets 102a and 102b, respectively, and configured to receive the first and second select signals SS1 and SS2, respectively. The first and second multiplexers M1 and M2 are further configured to receive the first and second pluralities of clock signals C1, ..., CM and C2, ..., CN, respectively. In one embodiment, the first and second pluralities of clock signals C1, ..., CM and C2, ..., CN are generated by a first clock generator (not shown) of the SoC 100. In another embodiment, the first and second pluralities of clock signals C1, ..., CM and C2, ..., CN are generated by a second plurality of clock generators (not shown) of the SoC 100.

The first multiplexer M1 is further configured to select and output, based on the first select signal SS1, the first clock signal C1 of the first plurality of clock signals C1, CM. The second multiplexer M2 is further configured to select and output, based on the second select signal SS2, the second clock signal C2 of the second plurality of clock signals C2, ..., CN. In one example, the first and second clock signals C1 and C2 are a pair of synchronous clock signals (i.e., the phase difference between the first and second clock signals C1 and C2 is zero). In another example, the first and second clock signals C1 and C2 are a pair of asynchronous clock signals (i.e., the phase difference between the first and second clock signals C1 and C2 is non-zero).

The clock sweeping system 104 is coupled with the first and second multiplexers M1 and M2, and configured to receive the first and second clock signals C1 and C2 from the first and second multiplexers M1 and M2, respectively. In one embodiment, the clock sweeping system 104 is further configured to sweep the first clock signal C1 with respect to the second clock signal C2 to generate first and second output clock signals OC1 and OC2 for the plurality of times. In another embodiment, the clock sweeping system 104 is further configured to sweep the second clock signal C2 with respect to the first clock signal C1 to generate the first and second output clock signals OC1 and OC2 for the plurality of times. The clock sweeping system 104 is further configured to output the first and second output clock signals OC1 and OC2 for the plurality of times. The first output clock signal OC1 is asynchronous with respect to the second output clock signal OC2. In other words, the phase difference between the first and second output clock signals OC1 and OC2 is non-zero. The clock sweeping system 104 is explained in detail in conjunction with FIG. 2.

It will be apparent to a person skilled in the art that although in the current embodiment, the SoC 100 includes the clock sweeping system 104 that receives the first and second clock signals C1 and C2 from the first and second multiplexers M1 and M2, the scope of the present disclosure is not limited to it. In various embodiments, the SoC 100 includes multiple clock sweeping systems (such as the clock sweeping system 104) at various locations on the SoC 100 where a clock tree is present such that each clock sweeping system receives two clock signals outputted by the clock tree, without deviating from the scope of the present disclosure.

The processing circuit 106 is coupled with the clock sweeping system 104, and configured to receive the first and second output clock signals OC1 and OC2 for associated operations (such as metastability detection). In one embodiment, the processing circuit 106 is a metastability detector circuit. The metastability detector circuit is configured to receive the first and second output clock signals OC1 and OC2 for the plurality of times. The metastability detector circuit is further configured to identify the phase of the first and second output clock signals OC1 and OC2 and detect the metastability with respect to a timing behavior of the first and second output clock signals OC1 and OC2.

Figure 2:
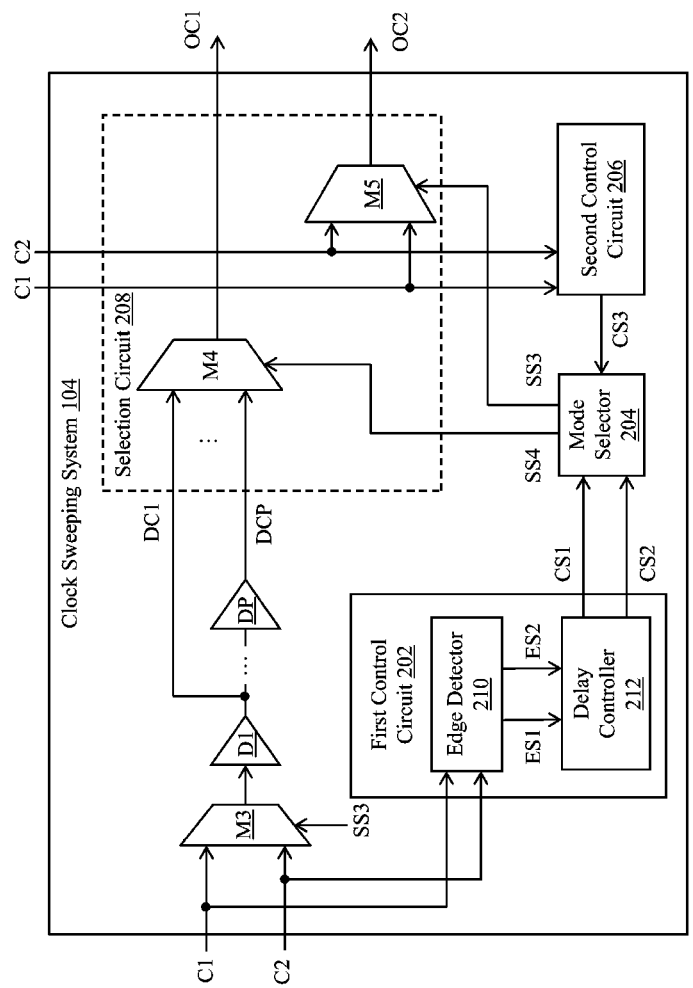
FIG. 2 illustrates a schematic block diagram of a clock sweeping system of the SoC of FIG. 1 in accordance with an embodiment of the present disclosure.

FIG. 2 illustrates a schematic block diagram of the clock sweeping system 104 in accordance with an embodiment of the present disclosure. The clock sweeping system 104 includes a third multiplexer M3, and a plurality of delay elements D1, ..., DP of which first and Pth delay elements D1 and DP are shown. The clock sweeping system 104 further includes a first control circuit 202, a mode selector 204, a second control circuit 206, and a selection circuit 208.

The third multiplexer M3 is configured to receive the first and second clock signals C1 and C2, and a third select signal SS3. The third multiplexer M3 is further configured to select and provide, based on the third select signal SS3, one of the first and second clock signals C1 and C2 to the plurality of delay elements D1, ..., DP. The third select signal SS3 is indicative of a selection of one of the first and second clock signals C1 and C2.

The plurality of delay elements D1, ..., DP are coupled in series such that each delay element of the plurality of delay elements D1, ..., DP is configured to receive an output signal generated by a previous delay element of the plurality of delay elements D1, ..., DP. The plurality of delay elements D1, ..., DP are configured to generate a plurality of delayed clock signals DC1, ..., DCP of which first and Pth delayed clock signals DC1 and DCP are shown. Each delay element of the plurality of delay elements D1, ..., DP is configured to receive an input signal and delay the input signal to generate a corresponding first delayed clock signal of the plurality of delayed clock signals DC1, ..., DCP. The input signal is one of the first clock signal C1, the second clock signal C2, and the output signal generated by the previous delay element of the plurality of delay elements D1, ..., DP.

The first delay element D1 is coupled with the third multiplexer M3, and configured to receive one of the first and second clock signals C1 and C2 as the input signal and delay the input signal by a first delay value to generate the first delayed clock signal DC1. A second delay element (not shown) of the plurality of delay elements D1, ..., DP is coupled with the first delay element D1, and configured to receive the output signal generated by the first delay element D1 (i.e., the first delayed clock signal DC1) and delay the first delayed clock signal DC1 by a second delay value to generate a second delayed clock signal (not shown) of the plurality of delayed clock signals DC1, ..., DCP. Similarly, the Pth delay element DP is coupled with a (P−1)th delay element (not shown), and configured to receive the output signal generated by the (P−1)th delay element and delay the received output signal by a Pth delay value to generate the Pth delayed clock signal DCP. In one embodiment, a delay value associated with each delay element of the plurality of delay elements D1, ..., DP (such as the first, second, and Pth delay values) is same. In another embodiment, the delay value associated with each delay element of the plurality of delay elements D1, ..., DP (such as the first, second, and Pth delay values) is different. In one example, the delay value associated with each delay element of the plurality of delay elements D1, ..., DP (such as the first, second, and Pth delay values) is equal to '100' picosecond (ps) delay.

The first control circuit 202 includes an edge detector 210 and a delay controller 212. The edge detector 210 is configured to receive the first and second clock signals C1 and C2. The edge detector 210 is further configured to generate first and second edge signals ES1 and ES2 based on the first and second clock signals C1 and C2, respectively. The first edge signal ES1 is indicative of one of positive and negative clock edges of the first clock signal C1. The second edge signal ES2 is indicative of one of positive and negative clock edges of the second clock signal C2. In one embodiment, the edge detector 210 is configured to count a fixed number of positive clock edges of the first clock signal C1 and generate the first edge signal ES1 based on the number of positive clock edges of the first clock signal C1. In another embodiment, the edge detector 210 counts a fixed number of negative clock edges of the first clock signal C1 and generates the first edge signal ES1 based on the number of negative clock edges of the first clock signal C1. The edge detector 210 generates the second edge signal ES2 in a manner similar to the generation of the first edge signal ES1.

The delay controller 212 is coupled with the edge detector 210, and configured to receive the first and second edge signals ES1 and ES2 from the edge detector 210. The delay controller 212 is further configured to generate and provide, based on the first and second edge signals ES1 and ES2, first and second control signals CS1 and CS2 to the mode selector 204. The first control signal CS1 is indicative of a coarse delay selection. The coarse delay selection corresponds to a selection of a first set of delayed clock signals from the plurality of delayed clock signals DC1, DCP such that two consecutive delayed clock signals of the first set of delayed clock signals are associated with a coarse delay value between each other. In one example, the coarse delay value is a '200' ps delay. Thus, a third delayed clock signal of the first set of delayed clock signals is delayed by 200 ps with respect to a fourth delayed clock signal of the first set of delayed clock signals. The second control signal CS2 is indicative of a fine delay selection. The fine delay selection corresponds to a selection of a second set of delayed clock signals from the plurality of delayed clock signals DC1, ..., DCP such that two consecutive delayed clock signals of the second set of delayed clock signals are associated with a fine delay value between each other. In one example, the fine delay value is a '100' ps delay. Thus, a fifth delayed clock signal of the second set of delayed clock signals is delayed by 100 ps with respect to a sixth delayed clock signal of the second set of delayed clock signals.

The mode selector 204 is coupled with the delay controller 212, and configured to receive the first and second control signals CS1 and CS2. The mode selector 204 is further configured to receive a third control signal CS3. The mode selector 204 is further configured to generate the third select signal SS3 and a fourth select signal SS4 based on one of the first through third control signals CS1-CS3. The third select signal SS3 is indicative of a selection of one of the first and second clock signals C1 and C2 for sweeping with respect to other. The fourth select signal SS4 is indicative of a selection of multiple delayed clock signals (such as, the first and second sets of delayed clock signals) of the plurality of delayed clock signals DC1, ..., DCP one at a time. The mode selector 204 is further coupled with the third multiplexer M3 and the selection circuit 208, and further configured to provide the third select signal SS3 to the third multiplexer M3 and the selection circuit 208, and the fourth select signal SS4 to the selection circuit 208.

The second control circuit 206 is configured to receive the first and second clock signals C1 and C2. The second control circuit 206 is coupled with the mode selector 204, and further configured to generate and provide the third control signal CS3, based on the first and second clock signals C1 and C2, to the mode selector 204. The third control signal CS3 is indicative of a configurable delay selection. The configurable delay selection corresponds to a selection of a third set of delayed clock signals from the plurality of delayed clock signals DC1, . . . , DCP such that two consecutive delayed clock signals of the third set of delayed clock signals are associated with one of the coarse delay value, the fine delay value, and a predetermined delay value between each other.

The selection circuit 208 is coupled with the plurality of delay elements D1, . . . , DP and the mode selector 204, and configured to receive the plurality of delayed clock signals DC1, . . . , DCP and the third and fourth select signals SS3 and SS4. The selection circuit 208 is further configured to select and output, based on the fourth select signal SS4 for the plurality of times, i.e., multiple times, one of the plurality of delayed clock signals DC1, . . . , DCP as the first output clock signal OC1. In one embodiment, the fourth select signal SS4 indicates selection of the first set of delayed clock signals, and the selection circuit 208 selects and outputs each delayed clock signal of the first set of delayed clock signals as the first output clock signal OC1 one at a time. In another embodiment, the fourth select signal SS4 indicates selection of the second set of delayed clock signals, and the selection circuit 208 selects and outputs each delayed clock signal of the second set of delayed clock signals as the first output clock signal OC1 one at a time. In yet another embodiment, the fourth select signal SS4 indicates selection of the third set of delayed clock signals, and the selection circuit 208 selects and outputs each delayed clock signal of the third set of delayed clock signals as the first output clock signal OC1 one at a time. Thus, the selection circuit 208 outputs for a plurality of times, a corresponding second delayed clock signal (i.e., a delayed clock signal out of the first set of delayed clock signals, the second set of delayed clock signals, and the third set of delayed clock signals) that is based on the fourth select signal SS4 as the first output clock signal OC1. The selection circuit 208 is further configured to receive the first and second clock signals C1 and C2, and select and output, based on the third select signal SS3, one of the first and second clock signals C1 and C2 as the second output clock signal OC2. The first and second output clock signals OC1 and OC2 are an asynchronous pair of clock signals (i.e., the first and second clock signals C1 and C2 are asynchronous with respect to each other). The selection circuit 208 includes fourth and fifth multiplexers M4 and M5.

The fourth multiplexer M4 is coupled with the plurality of delay elements D1, . . . , DP, and configured to receive the plurality of delayed clock signals DC1, . . . , DCP. The fourth multiplexer M4 is further coupled with the mode selector 204, and configured to receive the fourth select signal SS4. Further, the fourth multiplexer M4 is configured to select and output, based on the fourth select signal SS4 for the plurality of times, the corresponding second delayed clock signal of the plurality of delayed clock signals DC1, . . . , DCP as the first output clock signal OC1. In one embodiment, the first output clock signal OC1 is a delayed version of the first clock signal C1. In another embodiment, the first output clock signal OC1 is a delayed version of the second clock signal C2.

When the mode selector 204 generates the fourth select signal SS4, based on the first control signal CS1, the fourth multiplexer M4 selects, for the plurality of times, the corresponding second delayed clock signal from the first set of delayed clock signals of the plurality of delayed clock signals DC1, . . . , DCP. When the mode selector 204 generates the fourth select signal SS4, based on the second control signal CS2, the fourth multiplexer M4 selects, for the plurality of times, the corresponding second delayed clock signal from the second set of delayed clock signals of the plurality of delayed clock signals DC1, . . . , DCP. When the mode selector 204 generates the fourth select signal SS4, based on the third control signal CS3, the fourth multiplexer M4 selects, for the plurality of times, the corresponding second delayed clock signal from the third set of delayed clock signals of the plurality of delayed clock signals DC1, . . . , DCP. Thus, based on the fourth select signal SS4, the fourth multiplexer M4 selects each signal of one of the first through third sets of delayed clock signals one at a time.

The fifth multiplexer M5 is coupled with the mode selector 204, and configured to receive the third select signal SS3 and the first and second clock signals C1 and C2. The fifth multiplexer M5 is further configured to select and output, based on the third select signal SS3, one of the first clock signal C1 and the second clock signal C2 as the second output clock signal OC2. When the third multiplexer M3 selects the first clock signal C1, the fifth multiplexer M5 selects the second clock signal C2. When the third multiplexer M3 selects the second clock signal C2, the fifth multiplexer M5 selects the first clock signal C1.

Figure 3A:
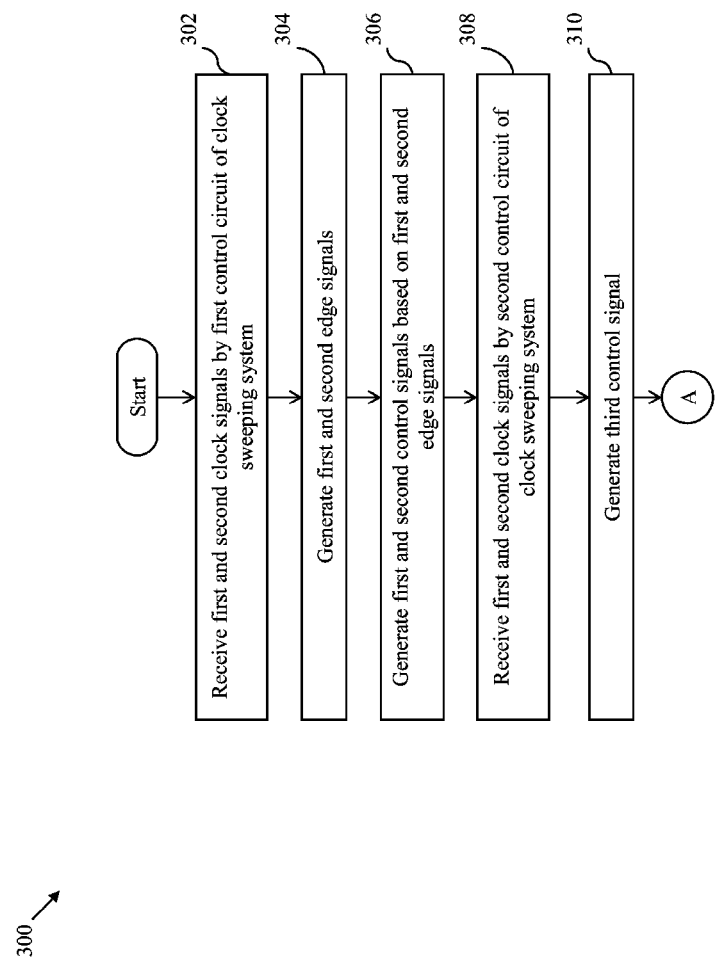
FIGS. 3A-3C, collectively, represent a flow chart that illustrates a clock sweeping method in accordance with an embodiment of the present disclosure.
Figure 3B:
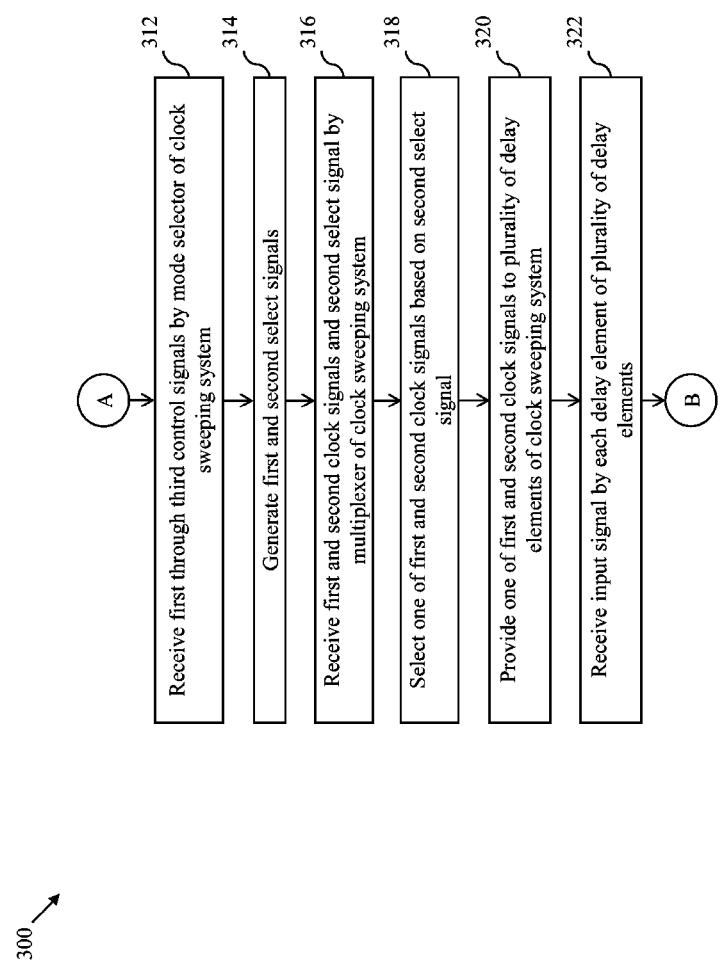
Figure 3C:
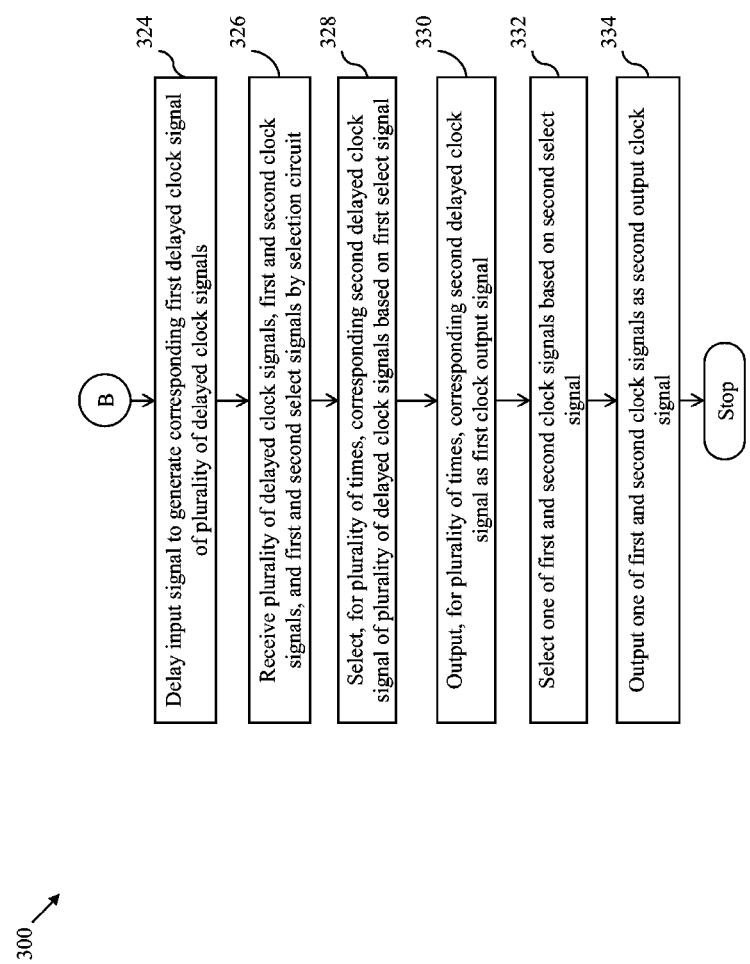

FIGS. 3A-3C, collectively, represent a flow chart 300 that illustrates a clock sweeping method in accordance with an embodiment of the present disclosure. The first and second pluralities of clock signals C1, . . . , CM and C2, . . . , CN include the first and second sets of asynchronous clock signal pairs that are defined by the first and second design constraint information associated with the SoC 100. During the RTL simulation, two clock signals of each asynchronous clock signal pair of the first set of asynchronous clock signal pairs are swept with respect to each other for the plurality of times. During the GLS, the two clock signals of each asynchronous clock signal pair of the first set of asynchronous clock signal pairs are swept with respect to each other for the plurality of times. Further, during the GLS, two clock signals of each asynchronous clock signal pair of the second set of asynchronous clock signal pairs are swept with respect to each other for the plurality of times. In one embodiment, the second set of asynchronous clock signal pairs are further added during the RTL simulation. During the RTL simulation and GLS, each asynchronous clock signal pair of the first and second sets of asynchronous clock signal pairs is validated by testing that the two clock signals of each asynchronous clock signal pair of the first and second sets of asynchronous clock signal pairs are asynchronous after sweeping the two clock signals with respect to each other. All the validated asynchronous clock signal pairs of the first and second sets of asynchronous clock signal pairs are implemented in the SoC 100 after the SoC 100 is manufactured. For the sake of ongoing discussion, it is assumed that the first and second clock signals C1 and C2 of the first and second pluralities of clock signals C1, . . . , CM and C2, . . . , CN are swept with respect to each other.

Referring now to FIG. 3A, at step 302, the first control circuit 202 receives the first and second clock signals C1 and C2. The first control circuit 202 receives the first and second clock signals C1 and C2. At step 304, the first control circuit 202 generates the first and second edge signals ES1 and ES2 based on the first and second clock signals C1 and C2, respectively. At step 306, the first control circuit 202 generates the first and second control signals CS1 and CS2 based on the first and second edge signals ES1 and ES2. At step 308, the second control circuit 206 receives the first and second clock signals C1 and C2. At step 310, the second control circuit 206 generates the third control signal CS3.

Referring now to FIG. 3B, at step 312, the mode selector 204 receives the first through third control signals CS1-CS3. At step 314, the mode selector 204 generates the third and fourth select signals SS3 and SS4. At step 316, the third multiplexer M3 receives the first and second clock signals C1 and C2. At step 318, the third multiplexer M3 selects one of the first and second clock signals C1 and C2 based on the third select signal SS3.

At step 320, the third multiplexer M3 provides one of the first and second clock signals C1 and C2 to the plurality of delay elements D1, . . . , DP for delaying one of the first and second clock signals C1 and C2 for the plurality of times. At step 322, each delay element of the plurality of delay elements D1, . . . , DP receives the input signal. The input signal is one of one of the first clock signal C1, the second clock signal C2, and the output signal generated by a previous delay element of the plurality of delay elements D1, . . . , DP.

Referring now to FIG. 3C, at step 324, the plurality of delay elements D1, . . . , DP delay the input signal to generate the corresponding first delayed clock signal of the plurality of delayed clock signals DC1, . . . , DCP for the plurality of times. At step 326, the selection circuit 208 receives the plurality of delayed clock signals DC1, . . . , DCP, the first and second clock signals C1 and C2, and the third and fourth select signals SS3 and SS4. At step 328, the selection circuit 208 selects, for the plurality of times, the corresponding second delayed clock signal of the plurality of delayed clock signals DC1, . . . , DCP based on the fourth select signal SS4. At step 330, the selection circuit 208 outputs, for the plurality of times, the corresponding second delayed clock signal as the first output clock signal OC1.

At step 332, the selection circuit 208 selects one of the first and second clock signals C1 and C2 based on the third select signal SS3. When the first clock signal C1 is selected by the third multiplexer M3, the second clock signal C2 is selected by the selection circuit 208. When the second clock signal C2 is selected by the third multiplexer M3, the first clock signal C1 is selected by the selection circuit 208. At step 334, the selection circuit 208 outputs one of the first and second clock signals C1 and C2 as the second output clock signal OC2.

The selection circuit 208 selects and outputs for the plurality of times, the corresponding second delayed clock signal as the first output clock signal OC1 and one of the first and second clock signals C1 and C2 as the second output clock signal OC2 such that the first output clock signal OC1 is a delayed version of one of the first and second clock signals C1 and C2. Thus, the clock sweeping system 104 sweeps the first and second clock signals C1 and C2 with respect to each other and outputs all possible pairs of asynchronous clock signals (i.e., the first and second output clock signals OC1 and OC2). Further, multiple such clock sweeping systems, such as the clock sweeping system 104, may be utilized in the SoC 100 or multiple clock signals (such as the first and second pluralities of clock signals C1, . . . , CM and C2, . . . , CN) may be provided to the clock sweeping system 104 during silicon validation and testing associated with the SoC 100. Thus, the clock sweeping system 104 is able to capture a fault in data communication associated with the first and second clock signals C1 and C2 on the SoC 100 and is not affected due to on-chip variations (OCV), process, voltage, and temperature (PVT) variations, and printed circuit board noises associated with the SoC 100. The clock sweeping system 104 of the present disclosure thus is configured to provide complete coverage of asynchronous clock signals on the SoC 100 by sweeping clock signals of each asynchronous clock signal pair (such as the first and second clock signals C1 and C2) on the SoC 100 as compared to conventional clock sweeping systems that fail to provide complete coverage of the asynchronous clock signals on the SoC 100.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The invention claimed is:

1. A clock sweeping system comprising:
    a plurality of delay elements that are coupled in series, and configured to generate a plurality of delayed clock signals, wherein each delay element is configured to receive an input signal, delay the input signal to generate a corresponding first delayed clock signal of the plurality of delayed clock signals, wherein the input signal is one of a first clock signal, a second clock signal, and an output signal generated by a previous delay element of the plurality of delay elements; and
    a selection circuit that is coupled with the plurality of delay elements, and configured to (i) receive the plurality of delayed clock signals, the first and second clock signals, and first and second select signals, (ii) select and output, based on the first select signal for a plurality of times, a corresponding second delayed clock signal of the plurality of delayed clock signals as a first output clock signal, and (iii) select and output, based on the second select signal, one of the first and second clock signals as a second output clock signal, wherein the first output clock signal is asynchronous with respect to the second output clock signal.

2. The clock sweeping system of claim 1, wherein the selection circuit comprises:
    a first multiplexer that is coupled with the plurality of delay elements, and configured to receive the first select signal and the plurality of delayed clock signals, and select and output, based on the first select signal for the plurality of times, the corresponding second delayed clock signal as the first output clock signal; and
    a second multiplexer that is configured to receive the first and second clock signals and the second select signal, and select and output, based on the second select signal, one of the first clock signal and the second clock signal as the second output clock signal.

3. The clock sweeping system of claim 2, further comprising a third multiplexer that is coupled with the plurality of delay elements, and configured to receive the second select signal and the first and second clock signals, and select and provide, based on the second select signal, one of the first and second clock signals to the plurality of delay elements, wherein when the third multiplexer selects the first clock signal, the second multiplexer selects the second clock signal, and when the third multiplexer selects the second clock signal, the second multiplexer selects the first clock signal.

4. The clock sweeping system of claim 3, further comprising a mode selector that is coupled with the first through third multiplexers, and configured to receive first through third control signals, generate the first and second select signals based on one of the first through third control signals, and provide the first select signal to the first multiplexer and the second select signal to the second and third multiplexers.

5. The clock sweeping system of claim 4, wherein:
when the mode selector generates the first select signal based on the first control signal, the first multiplexer selects, for the plurality of times, the corresponding second delayed clock signal from a first set of delayed clock signals of the plurality of delayed clock signals,
when the mode selector generates the first select signal based on the second control signal, the first multiplexer selects, for the plurality of times, the corresponding second delayed clock signal from a second set of delayed clock signals of the plurality of delayed clock signals, and
when the mode selector generates the first select signal based on the third control signal, the first multiplexer selects, for the plurality of times, the corresponding second delayed clock signal from a third set of delayed clock signals of the plurality of delayed clock signals.

6. The clock sweeping system of claim 4, further comprising a first control circuit that is coupled with the mode selector, wherein the first control circuit comprises:
an edge detector that is configured to receive the first and second clock signals and generate first and second edge signals, wherein the first edge signal is indicative of one of positive and negative clock edges of the first clock signal, and the second edge signal is indicative of one of positive and negative clock edges of the second clock signal; and
a delay controller that is coupled with the edge detector and the mode selector, and configured to receive the first and second edge signals, and generate and provide the first and second control signals based on the first and second edge signals to the mode selector, respectively.

7. The clock sweeping system of claim 4, further comprising a second control circuit that is coupled with the mode selector, and configured to receive the first and second clock signals, and generate the third control signal.

8. A system-on-chip (SoC), comprising:
first and second multiplexers that are configured to receive first and second pluralities of clock signals and first and second select signals, respectively, wherein the first multiplexer is further configured to select and output a first clock signal from the first plurality of clock signals based on the first select signal, and wherein the second multiplexer is further configured to select and output a second clock signal from the second plurality of clock signals based on the second select signal; and
a clock sweeping system coupled with the first and second multiplexers, wherein the clock sweeping system comprises:

a plurality of delay elements that are coupled in series, and configured to generate a plurality of delayed clock signals, wherein each delay element is configured to receive an input signal, delay the input signal to generate a corresponding first delayed clock signal of the plurality of delayed clock signals, wherein the input signal is one of the first clock signal, the second clock signal, and an output signal generated by a previous delay element of the plurality of delay elements; and
a selection circuit that is coupled with the plurality of delay elements and the first and second multiplexers, and configured to (i) receive the plurality of delayed clock signals, the first and second clock signals, and third and fourth select signals, (ii) select and output, based on the third select signal for a plurality of times, a corresponding second delayed clock signal of the plurality of delayed clock signals as a first output clock signal, and (iii) select and output, based on the fourth select signal, one of the first and second clock signals as a second output clock signal, wherein the first output clock signal is asynchronous with respect to the second output clock signal.

9. The SoC of claim 8, wherein:
the first and second pluralities of clock signals include first and second sets of asynchronous clock signal pairs, wherein the first and second sets of asynchronous clock signal pairs are defined by first and second design constraint information associated with the SoC, and
during a register-transfer level (RTL) simulation associated with the SoC, third and fourth clock signals of each asynchronous clock signal pair of the first set of asynchronous clock signal pairs are swept with respect to each other, and
during a gate-level simulation (GLS) associated with the SoC, the third and fourth clock signals of each asynchronous clock signal pair of the first set of asynchronous clock signal pairs are swept with respect to each other, and fifth and sixth clock signals of each asynchronous clock signal pair of the second set of asynchronous clock signal pairs are swept with respect to each other.

10. The SoC of claim 8, further comprising first and second register sets that are coupled with the first and second multiplexers, and configured to generate and provide the first and second select signals to the first and second multiplexers, respectively.

11. The SoC of claim 8, wherein the clock sweeping system further comprises a third multiplexer that is coupled with the first and second multiplexers and the plurality of delay elements, and configured to receive the fourth select signal and the first and second clock signals, and select and provide one of the first and second clock signals based on the fourth select signal to the plurality of delay elements.

12. The SoC of claim 11, wherein the selection circuit further comprises:
a fourth multiplexer that is coupled with the plurality of delay elements, and configured to receive the third select signal and the plurality of delayed clock signals, and select and output, based on the third select signal for the plurality of times, the corresponding second delayed clock signal as the first output clock signal; and
a fifth multiplexer that is coupled with the first and second multiplexers, and configured to receive the first and second clock signals, and the fourth select signal, and select and output, based on the fourth select signal, one of the first clock signal and the second clock signal as the second output clock signal, wherein when the third multiplexer selects the first clock signal, the fifth multiplexer selects the second clock signal, and when the third multiplexer selects the second clock signal, the fifth multiplexer selects the first clock signal.

13. The SoC of claim 12, wherein the clock sweeping system further comprises:
a mode selector that is coupled with the third, fourth, and fifth multiplexers, and configured to receive first through third control signals, generate the third and fourth select signals based on one of the first through third control signals, and provide the third select signal to the fourth multiplexer and the fourth select signal to the third and fifth multiplexers, wherein:
when the mode selector generates the third select signal based on the first control signal, the fourth multiplexer selects, for the plurality of times, the corresponding second delayed clock signal from a first set of delayed clock signals of the plurality of delayed clock signals,
when the mode selector generates the third select signal based on the second control signal, the fourth multiplexer selects, for the plurality of times, the corresponding second delayed clock signal from a second set of delayed clock signals of the plurality of delayed clock signals, and
when the mode selector generates the third select signal based on the third control signal, the fourth multiplexer selects, for the plurality of times, the corresponding second delayed clock signal from a third set of delayed clock signals of the plurality of delayed clock signals.

14. The SoC of claim 13, wherein the clock sweeping system further comprises:
a first control circuit that is coupled with the mode selector and the first and second multiplexers, wherein the first control circuit comprises:
an edge detector that is coupled with the first and second multiplexers, and configured to receive the first and second clock signals and generate first and second edge signals, wherein the first edge signal is indicative of one of positive and negative clock edges of the first clock signal, and the second edge signal is indicative of one of positive and negative clock edges of the second clock signal; and
a delay controller that is coupled with the edge detector and the mode selector, and configured to receive the first and second edge signals, and generate and provide the first and second control signals based on the first and second edge signals to the mode selector; and
a second control circuit that is coupled with the first and second multiplexers and the mode selector, and configured to receive the first and second clock signals, and generate and provide the third control signal to the mode selector.

15. A clock sweeping method, comprising:
receiving, by each delay element of a plurality of delay elements of a clock sweeping system, an input signal, wherein the input signal is one of a first clock signal, a second clock signal, and an output signal generated by a previous delay element of the plurality of delay elements;
delaying, by each delay element of the plurality of delay elements, the input signal to generate a corresponding first delayed clock signal of a plurality of delayed clock signals;
receiving, by a selection circuit of the clock sweeping system, the plurality of delayed clock signals, the first and second clock signals, and first and second select signals;
selecting, by the selection circuit for a plurality of times, a corresponding second delayed clock signal of the plurality of delayed clock signals based on the first select signal;
outputting, by the selection circuit for the plurality of times, the corresponding second delayed clock signal as a first output clock signal;
selecting, by the selection circuit, one of the first and second clock signals based on the second select signal; and
outputting, by the selection circuit, one of the first and second clock signals as a second output clock signal, wherein the first output clock signal is asynchronous with respect to the second output clock signal.

16. The clock sweeping method of claim 15, further comprising:
receiving, by a multiplexer of the clock sweeping system, the second select signal and the first and second clock signals;
selecting, by the multiplexer, one of the first and second clock signals based on the second select signal, wherein when the first clock signal is selected by the multiplexer, the second clock signal is selected by the selection circuit, and when the second clock signal is selected by the multiplexer, the first clock signal is selected by the selection circuit; and
providing, by the multiplexer, one of the first and second clock signals to the plurality of delay elements.

17. The clock sweeping method of claim 15, further comprising:
receiving, by a mode selector of the clock sweeping system, first through third control signals; and
generating, by the mode selector, the first and second select signals based on one of the first through third control signals.

18. The clock sweeping method of claim 17, wherein:
when the first select signal is generated by the mode selector based on the first control signal, the corresponding second delayed clock signal is selected, for the plurality of times by the selection circuit, from a first set of delayed clock signals of the plurality of delayed clock signals,
when the first select signal is generated by the mode selector based on the second control signal, the corresponding second delayed clock signal is selected, for the plurality of times by the selection circuit, from a second set of delayed clock signals of the plurality of delayed clock signals, and
when the first select signal is generated by the mode selector based on the third control signal, the corresponding second delayed clock signal is selected, for the plurality of times by the selection circuit, from a third set of delayed clock signals of the plurality of delayed clock signals.

19. The clock sweeping method of claim 17, further comprising:
receiving, by a first control circuit of the clock sweeping system, the first and second clock signals;
generating, by the first control circuit, first and second edge signals based on the first and second clock signals, wherein the first edge signal is indicative of one of positive and negative clock edges of the first clock signal, and the second edge signal is indicative of one of positive and negative clock edges of the second clock signal; and generating, by the first control circuit, the first and second control signals based on the first and second edge signals.

20. The clock sweeping method of claim 17, further comprising:

receiving, by a second control circuit of the clock sweeping system, the first and second clock signals; and generating, by the second control circuit, the third control signal based on the first and second clock signals.

\* \* \* \* \*